1

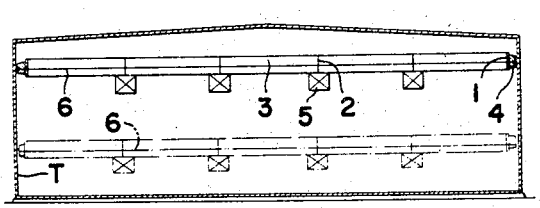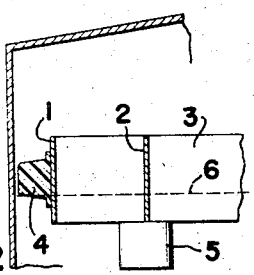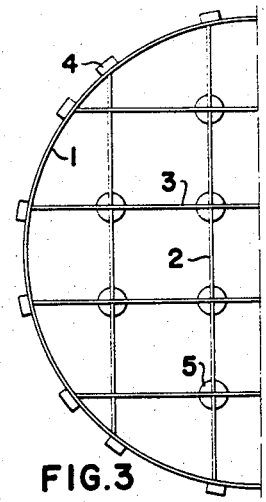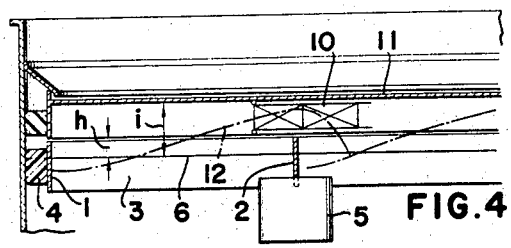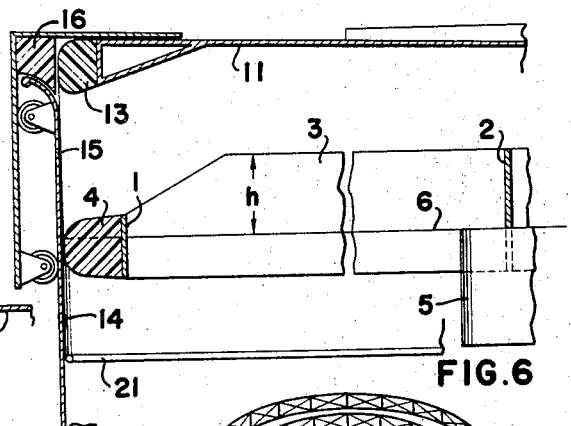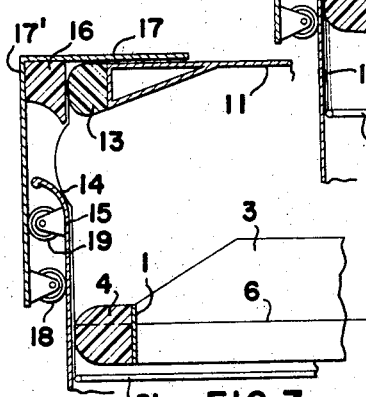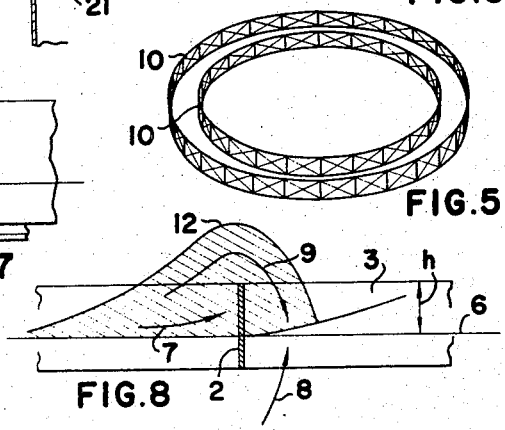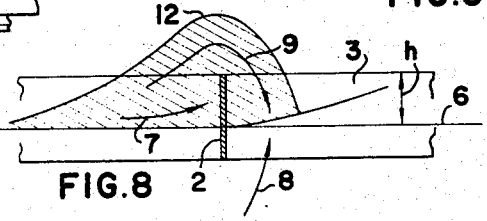

3,421,650
DEVICE FOR DAMPING SURFACE ROLL OF LIQUID IN STORAGE TANK
Gonroku Yumoto, Kawaguchi-shi, Japan, assignor to Chiyoda Kako Kensetsu Kabushiki Kaisha, Minata-ku, Tokyo, Japan
Filed Sept. 29, 1966, Ser. No. 582,873
Claims priority, application Japan, Oct. 5, 1965, 40/60,572, 40/60,573; Apr. 11, 1966, 41/22,428
U.S. Cl. 220—26   4 Claims
Int. Cl. B65d 87/18

ABSTRACT OF THE DISCLOSURE

A device for reducing the rolling motion of the surface of a liquid contained in a storage tank comprising a grating member formed by a plurality of longitudinal and transverse strips intersecting with each other to form a large number of small cellular sections, a shock absorbing member enveloping the grating member and contacting the inner peripheral wall of the tank and flotation members secured to the intersections of the strips and serving to support the device with the grating projecting a predetermined distance above the liquid surface.

---

The present invention relates to a liquid storage tank, more particularly to a device for damping a surface rolling of liquid stored in a liquid storage tank.

Damages sustained by a liquid storage tank at the time of an earthquake, including a fracture of the tank structure or leakage of liquid stored in the storage tank, are believed to be caused by the impact of the liquid, particularly the upper layer of the liquid, stored in the tank, which is caused to roll by means of the earthquake. In this connection, it is desirable to damp the surface rolling of the liquid as much as possible.

An object of the present invention, therefore, is to provide a device for damping surface rolling of liquid stored in a liquid storage tank, which is simple in construction and positive in operation.

Another object of the invention is to provide a device for damping surface rolling of liquid stored in a liquid storage tank, which is adapted for use in a liquid storage tank of either of the cone-shaped fixed roof type or floating roof type.

Still another object of the invention is to provide a device for damping surface rolling of liquid, which is operable with no exterior control and which therefore requires no labor for the operation thereof and is constructed inexpensively.

According to the present invention, there is provided a device for damping the surface roll of liquid stored in a liquid storage tank, which comprises an annular peripheral member having a diameter smaller than that of the tank inside disposed within said tank, a roll damping grating member secured to and encircled by said annular peripheral member, the grating member being formed of a plurality of elongated strips of sheet material with their planes perpendicular to the plane of the grating member and dividing the area surrounded by said annular peripheral member into a number of smaller areas, shock-absorbing members mounted on the exterior surface of said annular peripheral member and having a substantially rectangular radial cross section and float members secured to the lower side of the grating member for maintaining the roll damping grating device afloat on the surface of the liquid so that the roll damping grating strips of said roll damping device are disposed vertically in the liquid and projecting above said surface of the liquid a predetermined height.

With the device for damping surface roll of liquid according to the present invention, it is contemplated that the surface of liquid stored in a tank is divided both longitudinally and transversely into a number of small areas by the component strips of the roll damping grating device which are disposed within the annular peripheral member and project above the liquid surface a predetermined height, so that the momentum of liquid in the surface layer is finely divided by, and is absorbed by the elastic deformation of said component strips of the roll damping grating device. In addition, a liquid mass splashing up in one section and falling down into the other will interfere with or give an impact to a liquid mass rising in the latter sections, whereby the surface rolling of the liquid is suppressed.

The present invention will be described in further detail hereinafter with reference to the accompanying drawings, in which:

FIGURE 1 is a vertical sectional view showing the device for damping the surface rolling of liquid according to the present invention as provided in a liquid storage tank of the cone-shaped fixed roof type;

FIGURE 2 is a fragmentary vertical sectional view in enlarged scale, showing the device as shown in FIG. 1;

FIGURE 3 is a fragmentary plan view showing the device as shown in FIG. 1;

FIGURE 4 is a vertical sectional view showing the device provided in a liquid storage tank of the floating roof type;

FIGURE 5 is a perspective view showing a spacer member which is used with the device shown in FIG. 4;

FIGURE 6 is a fragmentary vertical section view showing a floating roof type liquid storage tank with the device provided therein, in which gas is filled in a space between the floating roof and the damping device;

FIGURE 7 is a view, similar to FIG. 6, showing the floating roof elevated up to the highest position;

FIGURE 8 is a diagrammatic view illustrating the function of an individual roll damping strip of the device.

Figure 9A:
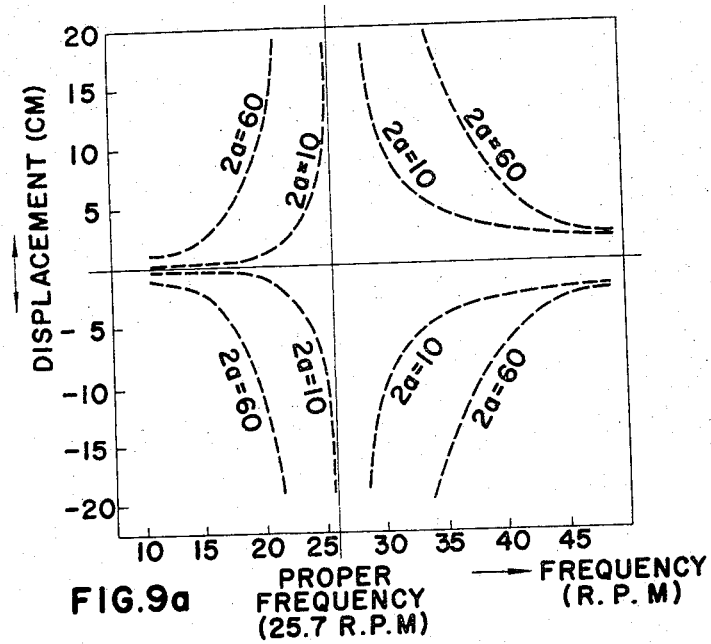
FIGURES 9a and 9b respectively are graphs showing the experimental result, which show the relationship between amplitude and frequency of the surface rolling of liquid in a liquid storage tank.

Referring to drawings, particularly to FIGS. 1, 2 and 3, a liquid storage tank having a fixed roof is generally indicated by T, in which a shallow annular peripheral member 1 having a diameter slightly smaller than that of the tank is disposed within said tank. On the interior of the annular peripheral member 1 there is disposed a roll damping member which is composed of longitudinal and transverse roll damping strips 2, 3 arranged in crossing relation in a lattice pattern and projecting vertically from the liquid surface to a predetermined height $h$. As will be appreciated from FIG. 8, this height $h$ is absolutely necessary for the roll damping strips to finely divide and absorb the momentum of the surface layer of the liquid, as well as to cause the liquid mass rising in one section to interfere with that rising in an adjacent section, at the time of an earthquake. Floats 5 are provided in a predetermined number below the intersections of the longitudinal and transverse roll damping strips 2, 3 so as to maintain the roll damping device afloat on the liquid surface while bearing the weight of the entire device. Mounted on the exterior surface of the annular peripheral member 1 are shock-absorbing members 4 which serve to alleviate the impact of the roll damping device against the inner surface of the tank wall. The buoyancy of the individual float and the total number of the floats required are determined such that the roll damping strips 2, 3 may be projected above the liquid surface, for example, by about ⅔ of their height. The dotted lines in FIG. 1 indicate the position of the device when lowered to the proximity of the bottom of the tank, as the level of liquid descends.

Description will now be given as to the case wherein the device is used in a liquid storage tank of the floating roof type. A floating roof is normally kept afloat directly on the surface of liquid in a tank. Therefore, when the liquid rolls intensely in the tank due to an earthquake, the floating roof also rolls and collides against the other structural members of the tank, causing a fracture or malfunction of the floating roof per se or the other structural members of the tank and possibly resulting in fire in the worst case. In order to deal with such problem, when using the device according to this invention in a floating roof type liquid storage tank, spacer members are interposed between said device and the floating roof of the tank. These spacer members are designated by numeral 10 in FIG. 4, and, as is best shown in FIG. 5, are composed of concentric rings of lattice structure. These spacer members are required for the purpose of not only preventing the rolling motion of the surface layer of the liquid from being transmitted directly to the floating roof as described above, but also providing a space for enabling the liquid mass, which is rising from the liquid surface in one section due to an earthquake to overflow the roll damping strip 2, and to drop into the adjoining section.

In other words, in mounting the device on a floating roof type tank, the spacer members 10 are used for the purpose of (1) preventing the bottom surface of the floating roof from directly contacting the surface of liquid in the tank, (2) maintaining the roll damping strips of the device projected above the liquid surface, and (3) providing a space for enabling the liquid mass rising at the time of an earthquake to drop into the adjoining section.

In order to achieve the foregoing objects, in the floating roof type tank as shown in FIG. 4, the arrangement is made such that the floating roof 11 is spaced from the liquid surface by a distance $i$ and the roll damping strips 2, 3 are projecting above the liquid surface by a distance $h$.

In this case, the floats 5 are obviously designed so as to achieve the objects set forth previously while bearing not only the weight of the roll damping device per se but also the weight of the floating roof and the spacer members. If necessary, the floats 5 may be made so that the buoyancy thereof is adjustable.

It should also be understood that the spacer member 10 may be of the type wherein it is assembled out of a plurality of component parts in a tank or alternatively of the type in which spacer elements of the same configuration are placed one above the other.

Another embodiment in which the device for damping the roll liquid surface is installed in a floating roof type tank is shown in FIGS. 6 and 7. In this embodiment, a gaseous spacer is employed in place of the spacer member 10 of lattice structure as shown in FIGS. 4 and 5. More specifically, in this embodiment, the surface roll damping device is maintained in a predetermined spaced relation to the floating roof by means of gas which is sealed in the space defined between the floating roof and the surface of liquid in the tank, and the weight of the floating roof is borne by the pressure of the gas and not by the floats.

Figure 9B:
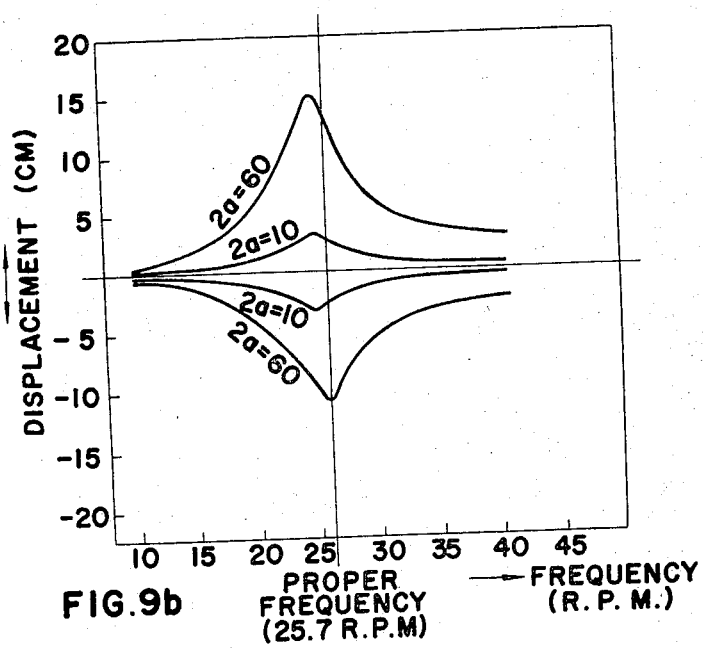

As best seen in FIG. 6, the floating roof 11 is maintained afloat at a desired level by suitable gas which is injected under pressure into the space enclosed by the floating roof 11, an elastic sealing material 13 disposed along the entire outer periphery of said floating roof, a cylindrical skirt 14 of flexible sheet material which is in sealable contact at its upper end with the outer surface of said sealing material 13 and extending downwardly therefrom and into the liquid surface 6. The pressure of gas in this space is determined by the weight of the floating roof and, because of this pressure, the cylindrical skirt 14 is brought in intimate contact with the inner surface 15 of the tank side wall. The liquid surface roll damping device is maintained afloat on the liquid surface 6 by means of the floats 5. The cylindrical skirt 14 is kept tense by a ring-shaped reinforcing member 21 which is attached to the lower end of said cylindrical skirt, so that the lower end portion of said cylindrical skirt is always located below the surface of the liquid. When the floating roof 11 is elevated up to the level at which the flexible sealing material 13, being carried by said floating roof, is spaced apart from the upper end of the tank side wall as shown in FIG. 7, due to the expansion of the sealed gas or the elevation of the liquid surface, it is possible for the floating roof to be dislodged from the tank by a lateral external force acting thereon. In order to avoid such danger, means 16 is provided along the entire circumference of the tank so as to prevent lateral displacement of the floating roof, said means 16 also serving as a rain shield. This means 16, as shown in FIGS. 6 and 7, comprises a vertically disposed cylindrical member 17', an annular member 17 mounted on the top end of said cylindrical member 17', rollers 18 provided on the inner surface of said cylindrical member 17' at the lower portion thereof, rollers 19 provided on the outer surface of the tank side wall at the top end portion thereof and a buffer 16 disposed along the corner formed by said cylindrical member 17' and said annular member 17, so that it is movable vertically in response to the expansion of the sealed gas or the elevation of the liquid level. As will be appreciated, a lateral displacement of the floating roof 11 with respect to the side wall of the tank can be prevented by the buffer. The floating roof type tank of the construction described hereinabove is advantageous in that the cylindrical skirt 14 is brought into completely hermetical contact with the inner surface of the tank side wall by the pressure of the sealed gas which is developed by the weight of said floating roof 11 and also in that, since the floating roof 11 is supported by the gas pressure, the complicated upper sealing mechanism and pontoon, which have been used heretofore, are not required. FIGS. 9a and 9b respectively show graphs of amplitude versus frequency of the surface roll of liquid in a tank which is provided with the device according to this invention therein and those of liquid in a tank which is not provided with the same. Upon comparing these two curves, it will be seen that the device of the present invention enables the amplitude of the surfaces roll to be reduced remarkably.

I claim:

1. A device for damping the surface roll of liquid in a liquid storage tank, which comprises an annular peripheral member having a diameter smaller than that of the tank disposed within said tank, a roll damping grating member secured to and encircled by said annular peripheral member, said grating member being formed of a plurality of elongated intersecting planar strips of sheet material with their planes perpendicular to the plane of the grating member and dividing the area surrounded by said annular peripheral member into a number of smaller areas, a plurality of shock-absorbing members mounted on the exterior surface of said annular peripheral member and having a substantially rectangular cross section in a direction radially of the peripheral member and float members secured on the lower side of said grating member at the intersections of the elongated strips of the grating member for maintaining said roll damping device afloat on the surface of the liquid so that the roll damping grating strips of said roll damping device are disposed vertically in the liquid and project above said surface of liquid a predetermined height.

2. A device for damping surface roll of liquid in a liquid storage tank according to claim 1 in which said storage tank has a floating roof, said device being positioned between said roof and the liquid, further comprising spacer members of predetermined height mounted on the upper surface of said device, said spacer members having a lattice structure so as to enable the liquid to pass therethrough.

3. A device for damping surface roll of liquid in a liquid storage tank according to claim 1 in which said storage tank has a floating roof, said device being positioned between the liquid surface and said roof, further comprising a gas impervious cylindrical skirt of flexible sheet material sealingly attached to and depending from the outer peripheral edge of said floating roof at least far enough so that its lower edge is below the surface of said liquid, said skirt having at least a portion thereof engaging with the inner peripheral surface of said tank, sealing means maintaining a sealing relationship between the lower edge of said skirt and the inner surface of said tank, said roof, said skirt and said liquid surface defining a closed chamber, and gas under pressure filling said chamber whereby said roof is supported by said gas.

4. A device for damping surface roll of liquid in a liquid storage tank according to claim 1 in which said storage tank has a floating roof and said device is positioned between said liquid surface and the roof further comprising means to prevent the lateral displacement of said roof comprising an annular member fixedly attached to said roof and depending over at least a part of the outer surface of said tank and roller means positioned between said annular member and said tank.

References Cited

UNITED STATES PATENTS

| | | | |
|---|---|---|---|
| 1,698,158 | 1/1929 | Glass | 220—26 |
| 1,819,401 | 8/1931 | Bailey | 220—26 |
| 1,932,394 | 10/1933 | Boardman | 220—26 |
| 2,281,748 | 5/1942 | Carney | 220—26 |
| 2,616,586 | 11/1952 | Lamb | 220—26 |
| 2,798,633 | 7/1957 | Cornell et al. | 220—26 |
| 3,055,533 | 9/1962 | Reese et al. | 220—26 |
| 3,104,775 | 9/1963 | Champagnat | 220—26 |

WILLIAM T. DIXSON, JR., *Primary Examiner.*

JAMES R. GARRETT, *Assistant Examiner.*